(12) United States Patent
Kannan et al.

(10) Patent No.: US 10,757,091 B2
(45) Date of Patent: Aug. 25, 2020

(54) CERTIFICATE-BASED SINGLE SIGN-ON (SSO) FROM MOBILE APPLICATIONS OVER THE INTERNET

(71) Applicant: International Business Machines Corporation, Armonk, NY (US)

(72) Inventors: Nalini Kannan, Bangalore (IN); Jatin Malik, Bangalore (IN); Payas Gupta, Bangalore (IN); Amitabh Mehra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 16/171,276

(22) Filed: Oct. 25, 2018

(65) Prior Publication Data
US 2020/0137042 A1      Apr. 30, 2020

(51) Int. Cl.
H04L 29/06      (2006.01)

(52) U.S. Cl.
CPC ........ *H04L 63/0815* (2013.01); *H04L 63/083* (2013.01)

(58) Field of Classification Search
CPC .......................... H04L 63/0815; H04L 63/083
See application file for complete search history.

(56) References Cited

U.S. PATENT DOCUMENTS

| | | | |
|---|---|---|---|
| 6,023,698 A * | 2/2000 | Lavey, Jr. ........... | H04L 12/2856 |
| 8,549,300 B1 * | 10/2013 | Kumar .................. | H04L 9/3247 |
| | | | 713/153 |
| 9,088,564 B1 * | 7/2015 | Hobson ................ | H04L 63/083 |
| 9,300,476 B2 | 3/2016 | Broch | |
| 10,003,600 B2 | 6/2018 | Karunakaran et al. | |
| 2008/0046740 A1 * | 2/2008 | Narayanan ........... | H04L 63/083 |
| | | | 713/176 |

(Continued)

OTHER PUBLICATIONS

Mishra, "Access your Apps Using Single Sign-on: Salesforce Identity," 2015.

(Continued)

*Primary Examiner* — J. Brant Murphy
(74) *Attorney, Agent, or Firm* — Jeffrey S. LaBaw; David H. Judson

(57) ABSTRACT

A technique to establish a secure session to a network-accessible application from a mobile device executing a native app. Initially, the network-accessible application is provisioned for access by an enterprise associating a set of one or more of its enterprise users with the network-accessible application. Thereafter, access to the application is enabled via an identity provider. In operation, the identity provider receives a request to validate that an enterprise user seeking access to the network-accessible application is associated with the application. The request is generated by the application in response to a login request initiated from the native app from a mobile device, wherein a certificate for the application is not available to the native app. Upon validating that the enterprise user is associated with the network-accessible application, the identity provider returns to the application an authentication token evidencing that the enterprise user is permitted to access the network-accessible application for a session.

21 Claims, 3 Drawing Sheets

(56) References Cited

U.S. PATENT DOCUMENTS

| | | | | | |
|---|---|---|---|---|---|
| 2009/0222657 | A1* | 9/2009 | Bender | ............... | H04L 9/3265 713/156 |
| 2011/0067095 | A1* | 3/2011 | Leicher | ............... | H04L 63/06 726/10 |
| 2012/0324556 | A1* | 12/2012 | Yefimov | ............... | H04W 12/06 726/7 |
| 2013/0219176 | A1* | 8/2013 | Akella | ............... | H04L 63/0815 713/165 |
| 2013/0346745 | A1* | 12/2013 | Broch | ............... | H04L 9/3263 713/156 |
| 2014/0082715 | A1* | 3/2014 | Grajek | ............... | G06F 16/955 726/8 |
| 2014/0181944 | A1* | 6/2014 | Ahmed | ............... | H04W 12/06 726/8 |
| 2014/0331060 | A1* | 11/2014 | Hayton | ............... | G06F 21/31 713/186 |
| 2015/0319174 | A1* | 11/2015 | Hayton | ............... | H04L 63/0884 726/7 |
| 2015/0326562 | A1* | 11/2015 | Belote | ............... | G06F 21/41 726/4 |
| 2016/0219060 | A1* | 7/2016 | Karunakaran | ............... | H04L 63/10 |

OTHER PUBLICATIONS

Pawar, "Mobile Authentication Done Right: Secure Single Sign-On for Mobile Apps," MobileIron, Nov. 2016.

* cited by examiner

CERTIFICATE-BASED SINGLE SIGN-ON (SSO) FROM MOBILE APPLICATIONS OVER THE INTERNET

BACKGROUND OF THE INVENTION

Technical Field

This disclosure relates generally to techniques to authenticate mobile device users to access applications over a network.

Background of the Related Art

There are an increasing number of enterprises that are looking to make the use of mobile devices easy for their workforce. A key part of this is providing a way for users to start using the wide array of native and web applications ("apps") on various device platforms, and with a certificate-based authentication. This ensures that users can obtain single sign-on (SSO)-based access to all needed solutions on their managed mobile devices, and with minimum inconvenience, such as the requirement to type out the right user identifier and credential for each such application.

A solution of this type must also be ubiquitous, and it must work consistently and reliably on as many apps as possible, all without requiring a dependency on the app developer (native or web) to have to make changes to their solution to enable the functionality. Apple® iOS devices provide one possible solution that involves providing hook in to handle certain specific authentication (namely, Kerberos) challenges within any app on the iOS platform; this approach, however, does not address various other mobile application platforms, such as those based on Android and Windows Phone, and it does not provide a general solution for the wide variety of web apps that run on these devices.

Attempts to address this need have involved the use of Virtual Private Network (VPN) tunneling (to authenticate users), but these approaches require hosting a VPN on the server, and installing and managing a VPN client on the mobile device. The requirement to install and manage a VPN client on the mobile device is undesirable.

There remains a need to enable certificate-based sign-on for third party apps on varied mobile device platforms that do not have direct access to the certificates and to enable such an implementation to make use of available certificates.

BRIEF SUMMARY

A technique to establish a secure session to a network-accessible application from a mobile device executing a native app. Initially, and via a mobile device management platform, the network-accessible application is provisioned for access by an enterprise associating a set of one or more of its enterprise users with the network-accessible application. This provisioning operation establishes the enterprise's managed deployment of users for the application. Thereafter, access to the application is enabled via an identity provider (IdP), which interoperates with the application to manage certificate-based authentication to the application from mobile device user native apps, even without a certificate (for the application) being present on a user mobile device. In operation, the identity provider receives a request to validate that an enterprise user seeking access to the network-accessible application is associated with the application. The request is generated by the application in response to a login request initiated from the native app from a mobile device, wherein a certificate for the application is not available to the native app. Upon validating that the enterprise user is associated with the network-accessible application, the identity provider returns to the application an authentication token evidencing that the enterprise user is permitted to access the network-accessible application for a session. As a result, the application then opens up the enterprise user's account.

In a preferred embodiment, the mobile device executes a management app that executes in association with the native app on the device. Upon receipt of an indication that the user of the mobile device desires to authenticate to the network-accessible application, the management app assumes control of the login attempt from the native app. Using a unique session key for the current authentication attempt, the management app interacts with IdP, which undertakes the actual authentication with the application for the session key to obtain an authentication token (e.g., a SAML assertion) indicating that authentication is successful. On completion (the successful authentication for the session key), the management app updates the native app back-end and returns control back to the native app. During this authentication attempt, the login page continuously checks with the IdP to determine whether the authentication for the session key has been completed. When that confirmation is received, the login page passes on the authentication token to the app's back-end that initially invoked the IdP.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

As described above, the certificate-based single sign-on (SSO) from a mobile app technique of this disclosure is implemented in the context of a mobile device executing a native application from his or her device, and where the back-end of the application typically executes ("as-a-service") in the cloud. The following provides background on several enabling technologies.

Figure 1:
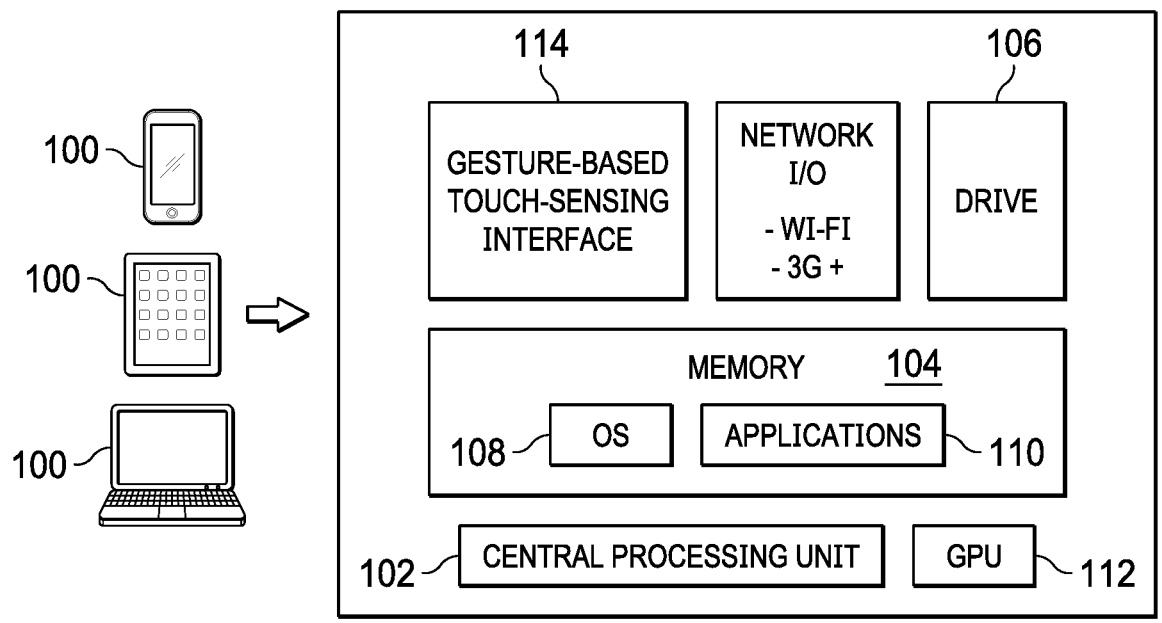
FIG. 1 illustrates a representative mobile device in which aspects of the disclosed technique may be implemented.

In particular, FIG. 1 illustrates representative mobile devices, namely, a smartphone 100, and a tablet device 102. As is well-known, such devices typically comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications including, without limitation, applications that require or take advantage of cryptographic operations. Such operations may be associated with a particular application, or the device operating system itself. As will be described, the techniques herein may be implemented with respect to any computing entity application.

In a representative but non-limiting embodiment, a mobile device is a smartphone or tablet, such as the iPhone® or iPad®, an Android™-based mobile device, or the like. Referring back to FIG. 1, a device of this type typically comprises a CPU 102, computer memory 104, such as RAM, and a data store 106. The device software includes operating system (e.g., Apple iOS, Android, Blackberry OS, Windows Mobile, or the like) 108, and generic support applications and utilities 110. Typically, the device includes a separate graphics processing unit (GPU) 112. A touch-sensing device or interface 114, such as a capacitive touchscreen, is configured to receive input from a user's touch and to send this information to processor 112. The interface 114 responds to gestures on the touch sensitive surface. Other input/output devices include software-based keyboards, cameras, microphones, accelerometers, magnetometers, radio or WiFi mechanisms, and the like.

More generally, the mobile device is any wireless client device, e.g., a cellphone, pager, a personal digital assistant (PDA, e.g., with GPRS NIC, WiFi card, etc.), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

For example, a mobile device as used herein is a 3G- (or next generation) compliant device that may include a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, the mobile device is any wireless client device, e.g., a smartphone, a tablet, a personal digital assistant (PDA, e.g., with GPRS or WiFi-based NIC), a mobile computer with a smartphone or tablet-like client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Typically, computing devices such as described also implement networking technology for exchanging data over short distances, such as Bluetooth, which is a wireless technology standard that uses short-wavelength UHF radio waves in the ISM band from 2.4 to 2.485 GHz). Devices that implement Bluetooth can create personal area networks (PANs). Bluetooth can connect to several devices at once. Alternatives to Bluetooth include, without limitation, ultra-wideband, induction wireless, and others.

The underlying network transport may be any communication medium including, without limitation, cellular, wireless, Wi-Fi, small cell (e.g., femto), and combinations thereof.

Figure 2:
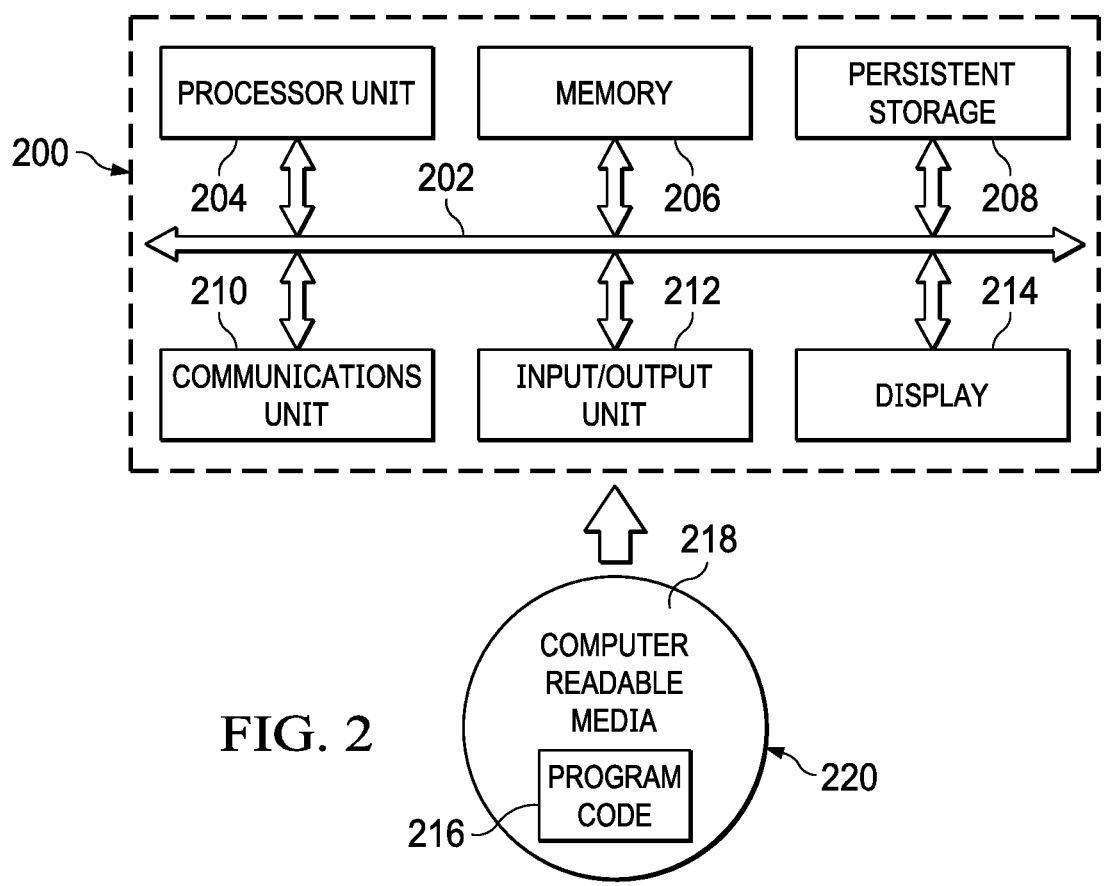
FIG. 2 is an exemplary block diagram of a data processing system in which aspects of the disclosed technique may be implemented.

With reference now to FIG. 2, a block diagram of an exemplary data processing system is shown and in which aspects of the SSO-based authentication scheme of this disclosure may be implemented. Data processing system 200 is an example of a computer in which computer usable code or instructions implementing the processes for illustrative embodiments of the disclosure may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. For a wireless access point (AP), the network interface card includes appropriate hardware and software support to implement the 802.11 protocol. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted. Also, the processes of the illustrative embodiments may be applied to a multiprocessor data processing system, other than the SMP system mentioned previously, without departing from the spirit and scope of the disclosed subject matter.

Mobile Device Management

Mobile Device Management (MDM) platforms allow enterprises to control or observe access to corporate or other organization resources from mobile devices, such as laptops, tablets, or smartphones. MDM platforms may gather information about mobile devices accessing corporate resources and networks, and typically they also allow organizations to control access to corporate resources based on status information or identity of users or devices. Furthermore, MDM platforms also enable an organization to restrict access to data or applications on the device. For example, a network may use a mobile device management platform to gather information about smart phones that access corporate e-mail. These devices can be restricted, such that, for example, if a user fails to confirm his identity (e.g., entering a password), e-mail apps can be blocked or stored e-mail data may be locked or wiped. One such mobile device management platform is IBM® MaaS360®.

Figure 3:
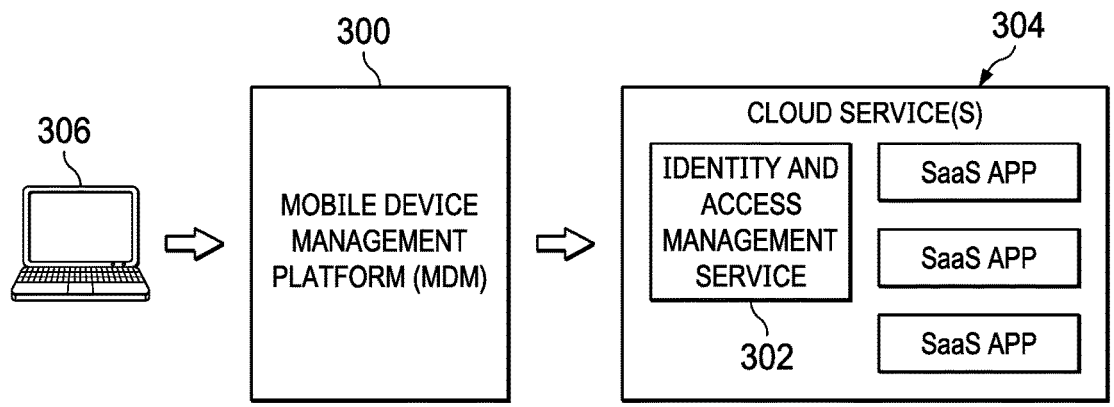
FIG. 3 depicts an operating environment in which the technique of this disclosure may be implemented.

It is also known to integrate an MDM (which itself typically executes as a cloud-based service) with various other cloud-based services. For example, and as depicted in FIG. 3, an MDM 300 (e.g., MaaS360) integrates with an Identity Service 302 (e.g., IBM Cloud Identity (CI), an Identity and Access Management (IAM) service delivered as a SaaS offering (namely, Identity-as-a-Service: ID-a-a-S)) that enables single sign-on (SSO) and conditional access capabilities across SaaS-based applications 304 for users on computing environments 306 (mobile, desktop, etc.). The MaaS360 and Cloud Identity integration enables IT administrators to provision third-party cloud applications to their users, and this integration provides the following features: Single sign-on (SSO) to Web or SaaS apps on mobile devices, wherein users do not have to enter credentials to authenticate with an app; conditional access management, which allows only entitled users and devices to access SaaS apps; simple onboarding and provisioning, wherein an administrator can start a new instance of Cloud Identity from the MaaS360 Portal by providing basic information; easy identity federation, wherein the administrator can use connectors that are already used by Cloud Identity to integrate with SaaS apps; threat management, which uses IBM X-Force® Exchange to manage the risk of threats; and interoperability, which enables access to Identity Providers that are already integrated with Cloud Identity. The above-mentioned integration supports mobile devices with iOS 7+ or Android "Lollipop" version 5.0.

More generally, the techniques herein may be implemented in any enterprise mobility management (EMM) platform that provides visibility and control of smartphones and tablets in the enterprise.

Cloud Computing Model

As described above, the technique of this disclosure may be used to enable a mobile device user to access the back-end of an application executing in a cloud computing environment. Thus, the following additional background regarding cloud computing is provided.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "The NIST Definition of Cloud Computing" by Peter Mell and Tim Grance, September 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

In a typical cloud computing environment, a set of functional abstraction layers are provided. These include a hardware and software layer, a virtualization layer, a management layer, and a workload layer.

The hardware and software layer includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer provides an abstraction layer from which the following examples of virtual entities may be provided: virtual servers; virtual storage; virtual networks, including virtual private networks; virtual applications and operating systems; and virtual clients.

The management layer provides various management functions. For example, resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

The workloads layer provides the functionality for which the cloud computing environment is utilized.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Certificate-Based Single Sign-on (SSO) from Mobile Devices Over the Internet

The following section describes the technique of this disclosure within the context of various commercially-available products and services, although this description is provided solely for exemplary purposes. The technique is not limited for use with the identified commercial products.

As noted above, MDM platforms such as MaaS360® integrate with various third party products and services to facilitate EMM. An example product is the Box® Platform (hereinafter "Box" or "box"), which is a mobile device-based cloud content management platform. MaaS360 integrates with Box for Enterprise Mobility Management (EMM) to allow joint customers of Box and MaaS360 to use Box or the Box Capture app from devices that are secured by MaaS360.

In operation, Box for EMM performs server-to-server validation of EMM credentials and checks managed app configurations before users can access content on Box. To provision this functionality, an Enterprise Administrator (EA) obtains Box for EMM, typically as an enterprise build for Android. After the EA acquires the app, he or she then provisions the app to users from the MaaS360 admin console. In particular, the Box for EMM application is designed for users who acquire or receive the app from their company's EMM provider. When the Box for EMM app loads into the MaaS360 App Catalog, the Administrator must set up a key value pair, typically provided by Box. The Administrator distributes the new Box for EMM solution to a user's device, and MaaS360 passes the key value pair to the Box for EMM app. Preferably, the key value information is passed to the app directly from the MaaS360 app installed on a mobile device, such as a device running Android.

When a user requests to login to the Box for EMM app, Box validates that the app is provisioned by the MaaS360 by using a one-time token, and then sends the key value pairs to the Box server. The Box server uses the key value pairs to check whether the enterprise and EMM combination is valid. The Box server then calls the MaaS360 Cloud to validate that the user is a member of that enterprise's managed deployment of Box. When the MaaS360 Cloud confirms that the device and user are managed by the enterprise, the user can log in to the app.

Figure 4:
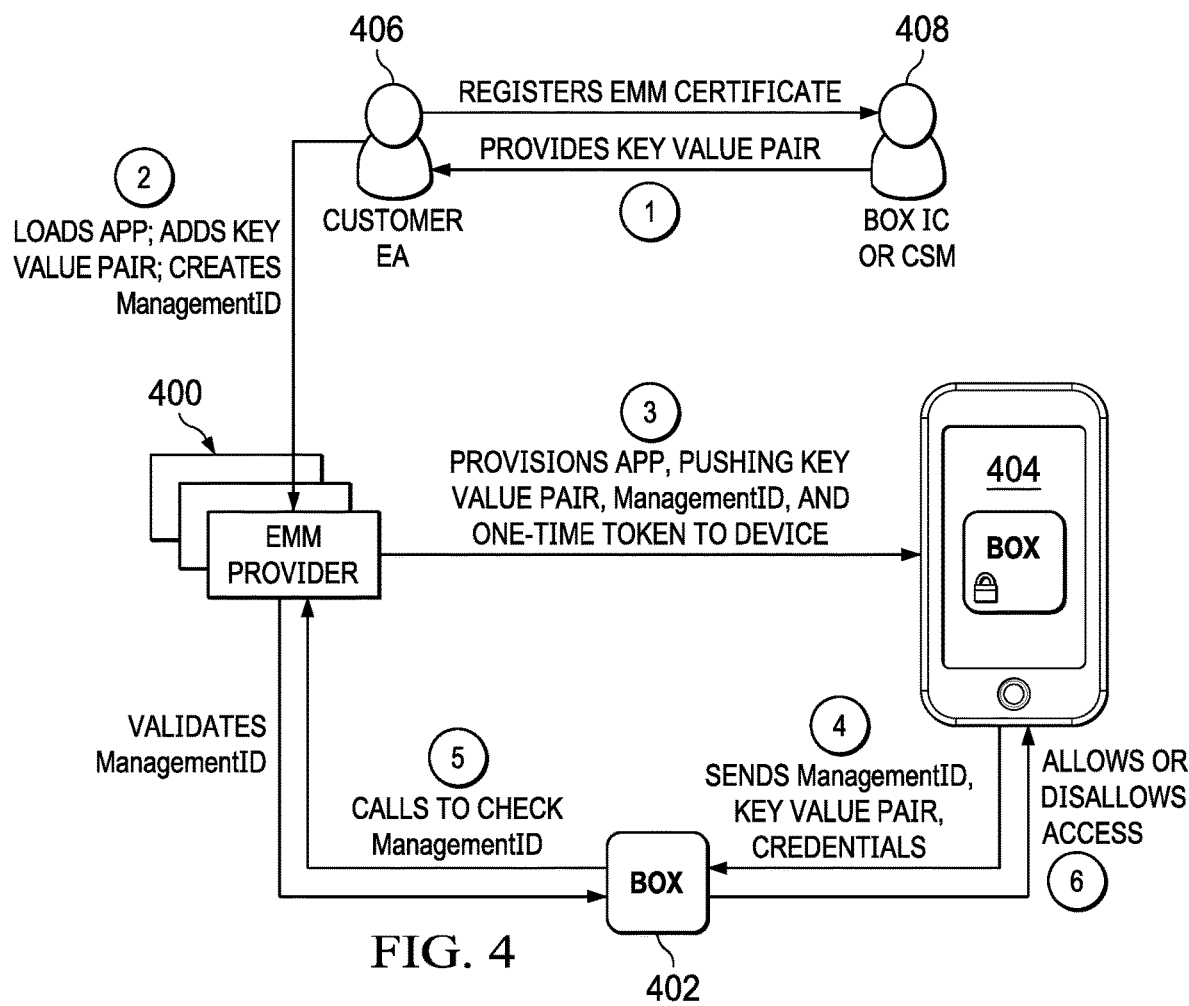
FIG. 4 depicts how an enterprise can enable Single Sign-On (SSO) and conditional access to a SasS-based application from a mobile device according to the technique of this disclosure.

FIG. 4 depicts the above-described process in detail. In this example, EMM provider 400 provides the MDM (e.g., MaaS360), "box" 402 is a server executing by the service provider of the same name, and the mobile device executing the Box® app 404 is associated with an enterprise end user. The provisioning process typically begins with an Enterprise Administrator (EA) 406 working with the EMM provider (e.g., a MaaS360 Customer Engineering team) to enable Box for EMM for the customer's MaaS360 account. The EMM provider 400 (e.g., a MaaS360 Customer Engineer (CE)) then completes the following steps, typically via a web-based provisioning portal (page): (a) enables web services and enables Box for EMM for Android; and (b) provides a web services URL, a billing ID, a certificate (e.g., a p12 certificate), and a password to the customer EA. The EA 406 registers with Box for the Box for EMM app by providing the URL, Billing ID, certificate password to, for example, their Implementation Consultant (IC) or Customer Success Manager (CSM) 408, who in turn provides a key value pair (Public ID) that the EA uses for the MaaS360 account. This is shown at (1). At step (2), the EA adds Box for EMM to the MDM (e.g., the MaaS360 App Catalog) and enters the Public ID provided by Box. For Android devices, the EA enters the value of the Public ID in a management field, e.g. the WorkPlace Policy>Docs Sync>Box for EMM Instance ID field. The EA clicks "Save and Publish" in the MaaS360 interface, and MaaS360 automatically generates a Management ID for Box for EMM on Android, which is the device CSN. At step (3), the EA distributes the Box for EMM app from the MaaS360 App Catalog to users, which includes the configuration for the app. The one-time token validates that the Box for EMM app is provisioned by MaaS360.

At step (4), and when a user requests to log in to Box for EMM, the app 404 sends the user's login credentials, Public ID, and Management ID to the box server 402. At step (5), the box server 402 checks the user's login credentials and uses the key value pair to match the user to the corresponding EMM provider 400. At step (6), and if the Box and EMM servers successfully validate the login credentials, Public ID, and Management ID, the user can log in to the app. If one of the checks fail, however, the user cannot log in to the app.

The provisioning technique shown in FIG. 4 and described above enables an enterprise to establish a "managed deployment" of enterprise users who are permitted to attempt access to a particular SaaS-based application via a native app executing on the user's computing device (typically a mobile phone, tablet, wireless-connected device, etc.). This provisioning in particular enables the server 402 to call out to the MDM 400 to validate that a particular user (seeking to access the server) indeed is a member of the enterprise's managed deployment.

With the above as background, the following provides the preferred technique for implementing steps (4)-(6) in FIG. 4. In this example, the user of the mobile device is one of the enterprise's managed deployment and is seeking to login to the server (e.g., box) executing in the cloud from the user's mobile device, but without the user's mobile device having to obtain a certificate specific to that server.

Figure 5:
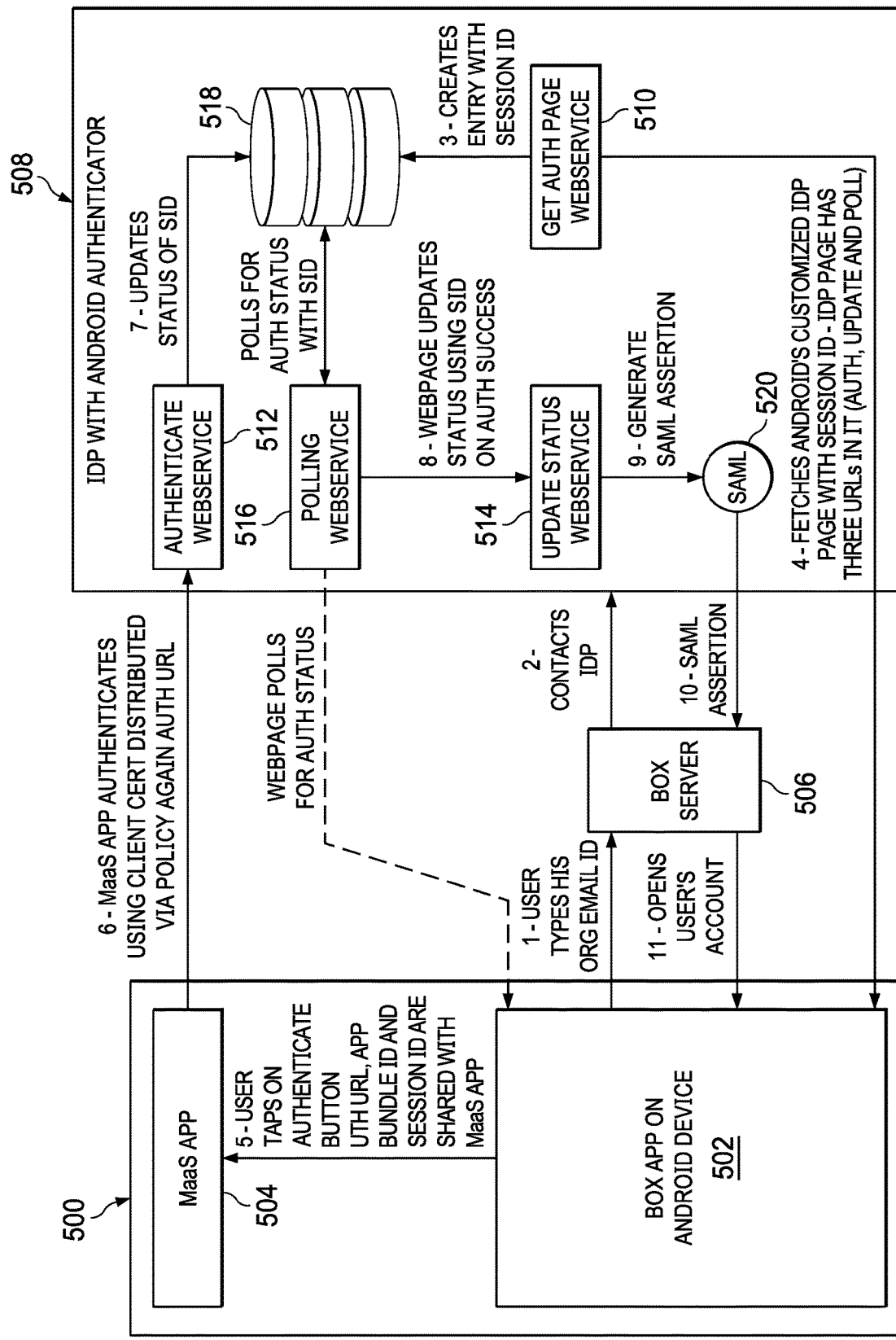
FIG. 5 depicts a detailed workflow of a user login according to the technique of this disclosure.

To this end, and as depicted in FIG. 5, a mobile device 500 (e.g., running Android) executes a native app (the box mobile app) 502, and a management app (MaaS360) 504. The box app 502 interoperates with the native app's back-end, in this example box server 506. According to this disclosure, the system includes an Identity Provider (IdP) 508 that handles the authentication (e.g., SAML, OAuth, or the like) and that comprises a set of functional components, and a database. In particular, the components comprise a set of web services, namely, a get authentication (login) page web service 510, an authenticate web service 512, an update status web service 514, and a polling web service 516. The IdP 508 also includes a database 518. The database 518 stores session identifiers (SIDs) and other data used to manage user logins. One or more of the web services 510, 512, 514 and 516 may be integrated with one another. These services are provided from an application server, a web server or the like. More generally, each identified function in the IdP is provided as a set of computer program instructions executed in a processor, typically on a physical or virtual machine. IdP 508 typically is provisioned as a cloud-based service, but this is not a requirement.

In general, and as will be seen, the system as shown (and, in particular IdP 508) enables certificate-based SSO by handling SAML/OAuth-based authentication on behalf of the mobile device users seeking access to cloud-based applications. In this example scenarios, which is not intended to be limited, the cloud-based application is box, and access to that service is being requested from the native app 502 executing on the end user mobile device.

To this end, and as depicted, at step (1) the mobile device user enters his or her credential (e.g., an email ID) in the box mobile app 502, which as noted is coupled to the box server 506. At step (2), the box server contacts the IdP 500. At step (3), the IdP creates an entry in the session ID database 518 and passes that session ID to the get authentication page web service 510, which provides a custom IdP login page that executes within the mobile app 502. At step (4), the box app 502 requests the customized IdP page with the session ID from the get authentication page web service 510, and the web service 510 responds by serving the IdP page. As depicted, the IdP login page includes several URLs, an authentication URL (auth URL), an update URL, and a poll URL). These URLs point respectively to the authentication web service 512, the update status web service 514, and the polling web service 516, in the IdP 508. As will be described, the mobile app 502 uses the poll URL to continuously poll the polling web service 516 for the status of an authentication for the session.

On the mobile device, and at step (5), control is switched to the MaaS app 504, typically by the user tapping on an authentication icon/button. The MaaS app 504 then attempts to authenticate the session. In particular, step (5) passes the auth URL, together with an application bundle identifier (app bundle ID) and the session ID (SID), from the box mobile app 502 to the MaaS app 504. Together, the {auth URL, app bundle ID and SID} comprise a unique key (or "session key") that the MaaS app will use to attempt to authenticate the session. To this end, and at step (6), the MaaS app 504 authenticates to the authentication web service 512 in the IdP 508 using a client certificate distributed via policy against the auth URL. Preferably, the client certificate is the certificate that was provided to the mobile device during the provisioning process depicted in FIG. 4

Upon a successful authentication, and at step (7), the authenticate web service 512 updates the status of the SID in the database 518. Meanwhile, the polling web service 516, which has been polling the database 518 to learn the authentication status, recognizes that the session (as identified by the SID) is now associated with a successful authentication. At step (8), the polling web service 516 updates this status using the SID to the update state web service 514. By steps ((6)-(8)), the management app confirms the successful authentication for the specific unique key. After doing so, the management app returns control back to the native app for which authentication is being done to begin with. At step (9), the update status web service 514 generates a SAML assertion 520 and, at step (10), the SAML assertion 520 is returned to the box server 506. At step (11), the box server 506 opens up the use's account on the mobile device app 502 to complete the process.

Thus, in operation, the IdP login page within the native app (from which authentication is being initiated) continuously checks with the IdP if the authentication for the session (identified by the unique key) has been completed. As soon as it gets that confirmation (namely, after the management app that handles the authentication on the native app's behalf has updated that state on the cloud), the IdP passes on the SAML assertion (with successful authentication confirmation) back to the app's back-end (in this example, the box server 506) that had invoked the IdP in the first place.

Although the technique has been described in the context of a mobile device (e.g. running Android), this is not a limitation. The technique may be implemented in any other endpoint including, without limitation, a laptop or tablet computer running Windows OS or MacOS, and the like.

The technique of this disclosure provides significant advantages. The primary advantage is the providing of certificate-based SSO from mobile apps over the Internet, irrespective of the operating system implemented on the mobile device. The approach herein supports all native Android and Windows Phone apps that support SAML/ OAuth authentication, and the approach can be extended for use with any web app. The approach works without requiring any change in these apps to handle certificates, and without requiring additional software, such as VPN clients and servers. Certificate-based authentication enables the system to enforce device-based authentication and authorization with device posture checks, which is not possible with user-based access control. With this approach, it is possible to enforce sophisticated authorization rules, such as conditional access, CRL checks, and the like.

The particular hardware and software implementation details described herein are merely for illustrative purposes are not meant to limit the scope of the described subject matter.

More generally, computing devices within the context of the disclosed subject matter are each a data processing system (such as shown in FIG. 1 or FIG. 2) comprising hardware and software, and these entities communicate with one another over a network, such as the 802.11 communications medium or link described. The technique may also be leveraged for other pre-shared key and open Wi-Fi scenarios. Still more generally, the subject matter described herein can take the form of an entirely hardware embodiment, an entirely software embodiment or an embodiment containing both hardware and software elements. In a preferred embodiment, the key exchange and WLAN shared key functionality is implemented in software, which includes but is not limited to firmware, resident software, microcode, and the like. Furthermore, the above-described WLAN zero configuration functionality (in whole or in part) can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the functionality (in whole or in part) is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to network-connected machines, such as described above.

Having described our invention, what we claim is as follows.

The invention claimed is:

1. A method to establish a secure session to a network-accessible application from a mobile device executing a native app, comprising:
   configuring the network-accessible application for access by mobile device users by associating a set of one or more enterprise users with the network-accessible application;
   receiving a request to validate that an enterprise user seeking access to the network-accessible application is associated with the network-accessible application, the request to validate having been generated by the network-accessible application in response to a login request initiated from the native app to the network-accessible application from a mobile device of the enterprise user, wherein a certificate for the network-accessible application is not available to the native app executing on the mobile device; and
   upon validating that the enterprise user is associated with the network-accessible application, returning to the network-accessible application an authentication token, the authentication token evidencing that the enterprise user is permitted to access the network-accessible application for a session;
   wherein upon receipt of the authentication token, access to the network-accessible application from the native app executing on the mobile device is enabled for the session.

2. The method as described in claim 1, further including serving a login page to the native app to facilitate establishing the secure session to the network-accessible application from the mobile device executing the native app.

3. The method as described in claim 2, wherein the login page comprises a unique session key, the unique session key comprising an authentication service URL, an update service URL, and a polling service URL.

4. The method as described in claim 3 wherein during an attempt to establish the session, a polling service reachable at the polling service URL receives one or more polls from the login page executing in the native app, wherein a poll seeks an authentication status.

5. The method as described in claim 3 wherein during an attempt to establish the session, an authentication service reachable at the authentication service URL receives and responds to a request to authenticate the unique session key.

6. The method as described in claim 5 wherein during an attempt to establish the session, an update service reachable at the update service URL responds to a successful authentication of the unique session key to generate and provide the authentication token to the network-accessible server.

7. The method as described in claim 1 wherein the authentication token is a SAML assertion.

8. An apparatus configured as an identity provider (IdP) to facilitate establishment of a secure session to a network-accessible application from a mobile device executing a native app, comprising:
   a processor;
   computer memory holding computer program instructions executed by the processor, the computer program instructions comprising program code configured to:
      configure the network-accessible application for access by mobile device users by associating a set of one or more enterprise users with the network-accessible application;
      receive a request to validate that an enterprise user seeking access to the network-accessible application is associated with the network-accessible application, the request to validate having been generated by the network-accessible application in response to a login request initiated from the native app to the network-accessible application from a mobile device of the enterprise user, wherein a certificate for the network-accessible application is not available to the native app executing on the mobile device; and
      upon validating that the enterprise user is associated with the network-accessible application, return to the network-accessible application an authentication token, the authentication token evidencing that the enterprise user is permitted to access the network-accessible application for a session;
      wherein upon receipt of the authentication token, access to the network-accessible application from the native app executing on the mobile device is enabled for the session.

9. The apparatus as described in claim 8, wherein the computer program code is configured to serve a login page to the native app to facilitate establishing the secure session to the network-accessible application from the mobile device executing the native app.

10. The apparatus as described in claim 9, wherein the login page comprises a unique session key, the unique session key comprising an authentication service URL, an update service URL, and a polling service URL.

11. The apparatus as described in claim 10 wherein the computer program code is configured to execute a polling service reachable at the polling service URL during an attempt to establish the session, the polling service configured to receive one or more polls from the login page executing in the native app, wherein a poll seeks an authentication status.

12. The apparatus as described in claim 10 wherein the computer program code is configured to execute an authentication service reachable at the authentication service URL during an attempt to establish the session, the authentication service configured to receive and respond to a request to authenticate the unique session key.

13. The apparatus as described in claim 12 wherein the computer program code is configured to execute an update service reachable at the update service URL during an attempt to establish the session, the update service configured to respond to a successful authentication of the unique session key to generate and provide the authentication token to the network-accessible server.

14. The apparatus as described in claim 8 wherein the authentication token is a SAML assertion.

15. A computer program product in a non-transitory computer readable medium for use in a data processing system configured as an identity provider (IdP), the identity provider configured to facilitate establishment of a secure session to a network-accessible application from a mobile device executing a native app, the computer program product holding computer program instructions executed by the data processing system, the computer program instructions comprising program code configured to:
   configure the network-accessible application for access by mobile device users by associating a set of one or more enterprise users with the network-accessible application;
   receive a request to validate that an enterprise user seeking access to the network-accessible application is associated with the network-accessible application, the request to validate having been generated by the network-accessible application in response to a login request initiated from the native app to the network-accessible application from a mobile device of the enterprise user, wherein a certificate for the network-accessible application is not available to the native app executing on the mobile device; and
   upon validating that the enterprise user is associated with the network-accessible application, return to the network-accessible application an authentication token, the authentication token evidencing that the enterprise user is permitted to access the network-accessible application for a session;
   wherein upon receipt of the authentication token, access to the network-accessible application from the native app executing on the mobile device is enabled for the session.

16. The computer program product as described in claim 15, wherein the computer program code is configured to serve a login page to the native app to facilitate establishing the secure session to the network-accessible application from the mobile device executing the native app.

17. The computer program product as described in claim 16, wherein the login page comprises a unique session key, the unique session key comprising an authentication service URL, an update service URL, and a polling service URL.

18. The computer program product as described in claim 17 wherein the computer program code is configured to execute a polling service reachable at the polling service URL during an attempt to establish the session, the polling service configured to receive one or more polls from the login page executing in the native app, wherein a poll seeks an authentication status.

19. The computer program product as described in claim 17 wherein the computer program code is configured to execute an authentication service reachable at the authentication service URL during an attempt to establish the session, the authentication service configured to receive and respond to a request to authenticate the unique session key.

20. The method as described in claim 19 wherein the computer program code is configured to execute an update service reachable at the update service URL during an attempt to establish the session, the update service configured to respond to a successful authentication of the unique session key to generate and provide the authentication token to the network-accessible server.

21. The computer program product as described in claim 15 wherein the authentication token is a SAML assertion.

* * * * *